United States Patent [19]
Goldberg

[11] 3,711,134
[45] Jan. 16, 1973

[54] ONE-PIECE CLEVIS
[75] Inventor: Carl Goldberg, Chicago, Ill.
[73] Assignee: Carl Goldberg Model, Inc., Chicago, Ill.
[22] Filed: July 16, 1971
[21] Appl. No.: 163,285

[52] U.S. Cl..................................287/100, 29/175 A
[51] Int. Cl................................................F16c 11/00
[58] Field of Search..............287/100, 96; 29/175 A; 248/74 PB

[56] References Cited
UNITED STATES PATENTS 3,482,862  12/1969  Maloney............................287/100
2,818,871  11/1958  Beaudry.............................132/48 R
106,339    8/1870   Dixon et al.........................287/100
3,144,695  8/1964   Budwig.............................248/74 PB
3,050,578  8/1962   Huebner...........................248/74 PB Primary Examiner—Andrew V. Kundrat
Attorney—Evan D. Roberts

[57] ABSTRACT

A clevis is disclosed herein providing a one-piece structure having an attaching body with spread-apart resilient bearing support arms in the as-formed condition with a pintle extending from one of the arms toward the other arm and adapted to be retained in an aperture retaining means in the other arm.

13 Claims, 15 Drawing Figures

PATENTED JAN 16 1973 3,711,134
SHEET 1 OF 2
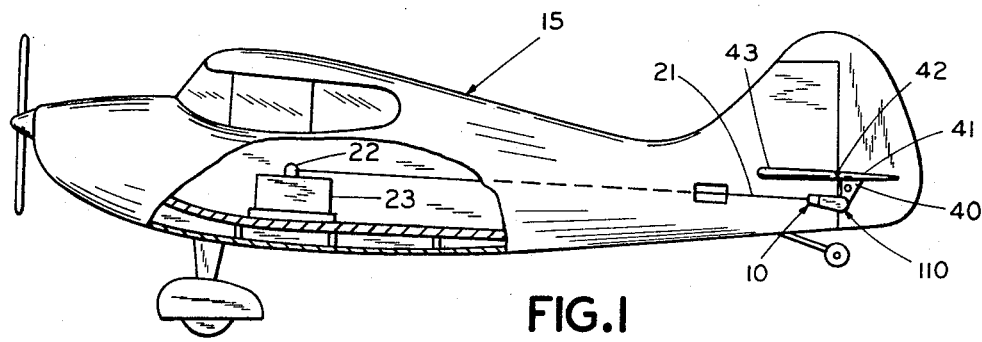
FIG.1
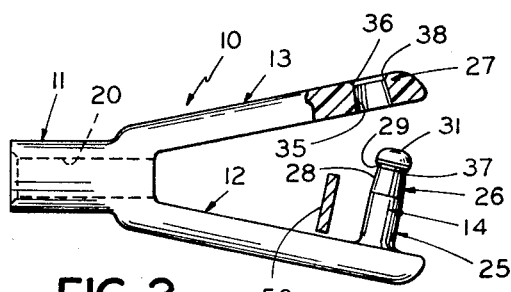
FIG.2
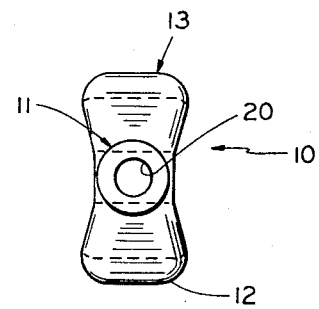
FIG.4
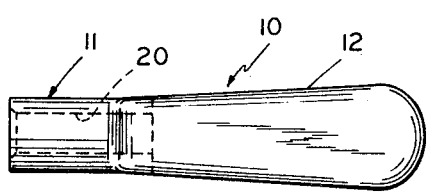
FIG.3
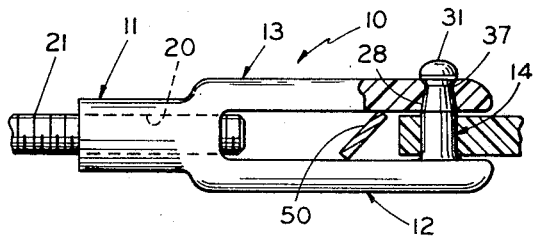
FIG.5
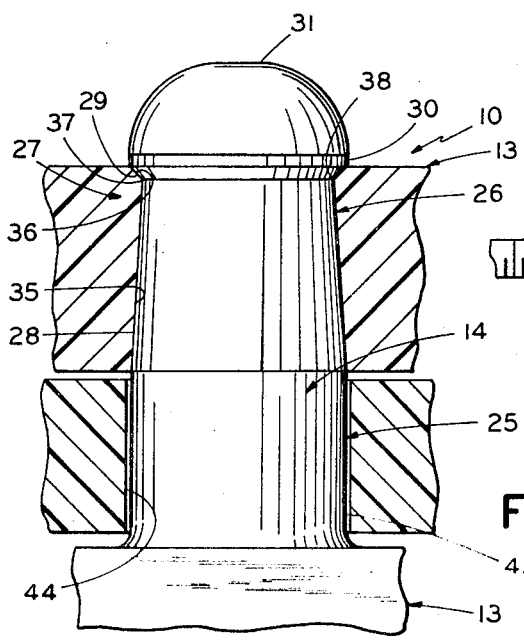
FIG.7
FIG.6
INVENTOR
CARL GOLDBERG
BY Evan D Roberts
ATTORNEY

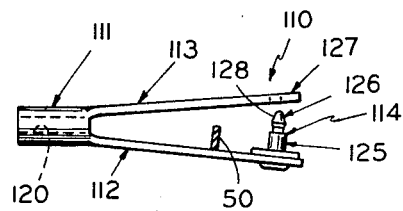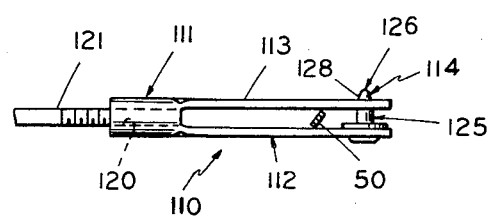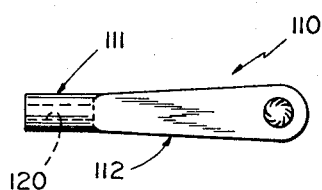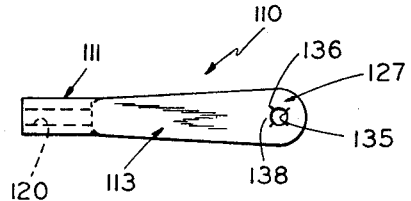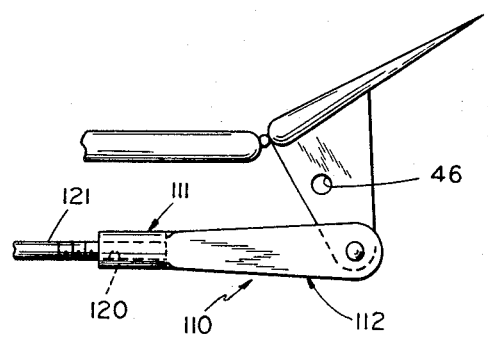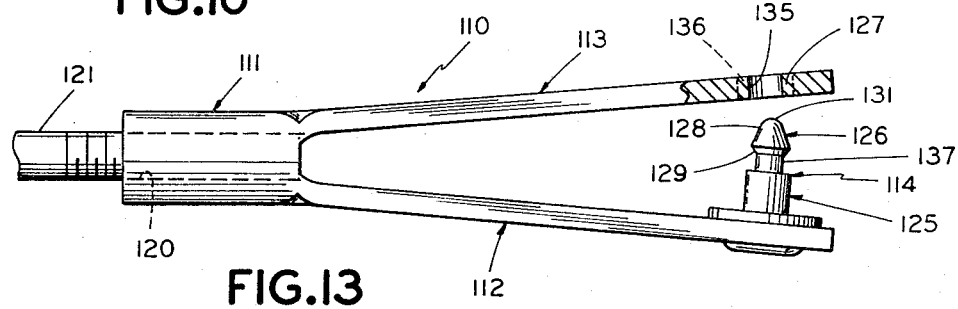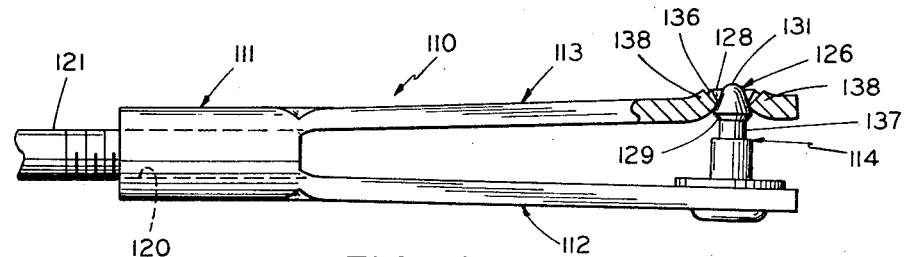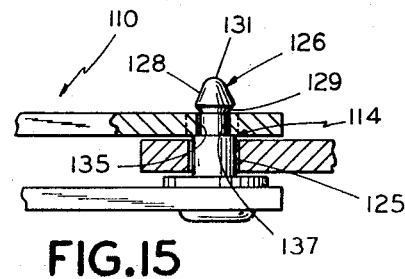

ONE-PIECE CLEVIS

SUMMARY OF THE INVENTION

This invention relates to a clevis which may be molded or otherwise formed in one piece, and will provide selectively releasable attachment between drive links. More particularly, the one-piece clevis of this invention provides a body which is adapted to be readily secured to one of the drive links and which has resilient bearing support arms generally flexible towards each other and extending from the body in spaced apart or spreading relationship in the normal as-formed or as-molded condition thereof. A bearing pintle, provided as an integral part of one of the arms, extends axially inwardly from one arm toward the other arm and terminates in a retaining means adjacent the other arm in the normal as-formed condition, for receiving the other drive link thereon between the arms and in driving relation on the pintle. Thus, the other drive link is readily insertable on the bearing pintle for connection with the clevis. The remaining bearing support arm is provided with a retaining aperture means adapted to receive and retain the pintle retaining means in a releasable locked position with the bearing support arms in a given spaced-apart relationship whereby the bearing pintle is supported on both sides of the other drive link which is thereby captured therebetween and borne on the pintle.

An exemplary utilization of the clevis of this invention is the interconnection of drive links in aircraft, and particularly, in the drive linkages of radio-controlled model airplanes, cars or other such drones wherein a highly reliable, durable and readily insertable and releasable clevis is required.

These types of installations require clevises of simple and economical construction which are readily insertable and releasable for modifications and adjustments, and yet must be particularly adapted to transmit severe driving forces under adverse conditions of vibration, high inertial shock forces, severe torsional thrust loads and adverse environmental conditions of contamination from oil, fuel, dirt etc.

It is, therefore, an object of this invention to provide a one-piece clevis which is economical and relatively uncomplicated to manufacture.

Another object of this invention is to provide a one-piece clevis which is readily connectible to one drive link, and which will in its normal as-formed condition, readily accept another drive link to readily provide a driving connection therebetween.

A further object of this invention is to provide a one-piece clevis which will provide a drive link bearing in a locked rigid and yet releasable position between arms of the clevis whereby a drive link will be positively retained on the bearing element in selectively releasable fashion.

A still further object of this invention is to provide a one-piece clevis wherein a bearing pintle on one arm is provided with retaining means adapted to be secured and retained within an aperture retaining means in the other arm to positively support the pintle as a bearing support between the clevis arms.

Another object of this invention is to provide a one-piece clevis which will retain a drive link under conditions of extreme and varying shock force, and yet which is readily and selectively releasable by the simple insertion and twisting of a screwdriver or the like between the arms thereof.

Another object of this invention is to provide a one-piece clevis with a bearing pintle extending from one arm and a pintle retaining aperture in the other arm, with complementing surfaces therebetween particularly adapted to cause the pintle to be detented or snapped into locking retention in the pintle retaining aperture to provide a snug and positive locking and positioning retention between the pintle and the pintle retaining aperture for strength and to prevent undesirable motion between the pintle and the pintle retaining arm.

Other advantages and novel aspects of the invention will become apparent upon the examination of the following detailed description, in conjunction with the accompanying drawings wherein:

FIG. 1 is a side view of an airplane with exposed control surface drive linkage illustrating the one-piece clevis of this invention;

FIg. 2 is a top view of a first embodiment of the one-piece clevis of this invention illustrating an as-formed spreading relationship of the bearing support arms with respect to the body, and the position of the pintle of one arm with respect to the retaining aperture in the other arm;

FIG. 3 is a side view of the one-piece clevis of this invention as illustrated in FIG. 2;

FIG. 4 is a left end view of the one-piece clevis of this invention illustrated in FIG. 2 showing the end of the body thereof;

FIg. 5 is a top view of the one-piece clevis of this invention illustrating the clevis in the assembled condition with the pintle snapped or detented into the pintle retaining aperture in one of the bearing support arms and supporting a drive link;

FIG. 6 is a side view of the assembled one-piece clevis of this invention illustrated in FIG. 5 showing the transmittal of reciprocating force therethrough to a control horn or drive link of the airplane elevator as illustrated in FIG. 1, with a screwdriver inserted between the arms in position to be twisted to release the clevis;

FIG. 7 is a partial sectional view of the one-piece clevis of this invention showing the pintle of one bearing support arm snapped or detented into the pintle retaining aperture means of the other arm; and with the elevator control horn pivotally mounted on the bearing pintle and positively retained between the releasably locked and spaced bearing support arms of the one-piece clevis.

FIG. 8 is a top view of a second embodiment of the one-piece clevis of this invention illustrating the as-formed spreading relationship of the bearing support arms with respect to the body, and the position of the pintle of one arm with respect to the retaining aperture in the other arm;

FIG. 9 is a front view of the second embodiment of the one-piece clevis of this invention as illustrated in FIG. 8 showing the pintle arm thereof;

FIG. 10 is a back side view of the second embodiment of the one-piece clevis of this invention illustrated in FIG. 8 showing the retaining arm thereof;

FIG. 11 is a top view of the second embodiment of the one-piece clevis of this invention illustrating the clevis in the assembled condition with the pintle snapped or detented into the pintle retaining aperture in one of the bearing support arms and supporting a link;

FIG. 12 is a side view of an assembled second embodiment of the one-piece clevis of this invention illustrated in FIG. 11 showing the transmittal of reciprocating force therethrough to the control horn or drive link of the airplane elevator as illustrated in FIG. 1, with a screwdriver inserted between the arms in position to be twisted to release the clevis;

FIG. 13 is an enlarged partially sectioned top view of the second embodiment of the clevis of this invention in its normal as-formed spread condition;

FIG. 14 is an enlarged partially sectioned top view of the second embodiment of the clevis of this invention with the pintle partially inserted in the retaining aperture; and FIG. 15 is a partial enlarged sectional view of the second embodiment of the one-piece clevis of this invention showing the pintle of one bearing support arm snapped or detented into the pintle retaining aperture means of the other arm; and with the elevator control horn pivotally mounted on the bearing pintle and positively retained between the releasably locked and spaced bearing support arms of the one-piece clevis.

A one-piece clevis generally represented by the numeral 10 is shown in FIGS. 1–7 for the purpose of illustrating and describing the first embodiment of this invention. The one-piece clevis 10 includes, among other things, a body 11, resilient bearing support arms 12 and 13 and a bearing pintle 14. The one-piece clevis structure 10 of this invention is preferably molded from nylon or an equivalent plastic and is illustrated in a typical environment in use with an airplane 15 (FIG. 1).

Clevis body 11 (FIGS. 2–4) is provided with an aperture 20 extending axially therethrough which can be threaded to receive a threaded push rod 21 (FIGS. 1, 5 and 6) as one drive link, or can self-threadingly receive the threaded push rod drive link 21, whereby the clevis is adjustably securable to the push rod 21. The push rod 21 is in turn secured to a horizontally reciprocating arm 22 of a servo 23 or the like which generates the motivating force to be transmitted by clevis 10.

Bearing support arms 12 and 13 are flat beam-like members extending generally from the exterior of body 11 in a normal spreading relationship from body 11 (FIG. 2), whereby arms 12 and 13 are resiliently flexible toward each other through the thinner lateral dimension thereof but are generally not flexible in a direction 90° thereto through the thicker dimension thereof.

Pintle 14 is formed as an integral part of bearing support arm 12 and comprises a bearing support portion 25 (FIGS. 2, 5 and 7) adjacent support arm 12, and a retaining end portion 26 extending to the end of pintle 10 and adjacent an aperture retaining means 27 (FIGS. 2 and 7) in other support arm 13. Pintle retaining end portion 26 comprises generally, a gradually tapered conical portion 28, and an abruptly tapered conical portion 29 intersecting in a trough 37. Surface 29 expands into a small cylindrical portion 30 (FIG. 7) with a rounded locating end surface 31 (FIG. 3).

Aperture retaining means 27 (FIG. 7) includes generally, a gradually tapered conical portion 35 complemental with the gradually tapered portion 28 of pintle retaining portion 26, and an abruptly tapered conical portion 36 which is complemental with the tapered portion 29 of pintle 14. Tapered surfaces 35 and 36 intersect in a restricting crest 38.

Airplane 15 (FIGS. 1 and 6), utilized to illustrate an appropriate application of the clevis 10 of this invention, is provided with control horn or drive link 40 extending from an elevator control surface 41. Surface 41 is pivotally secured at 42 to a horizontal stabilizer 43. The object of the reciprocating motivating force of the servo 23 is to cause the elevator 41 to oscillate about hinge 42 in response thereto whereby servo 23 will operate control surface 41. To accomplish this purpose, there must be some interconnecting drive link between push rod 21 and elevator horn 41.

In operation, the clevis 10 of this invention provides an adjustable and selectively releasable positive interconnecting link between reciprocating push rod 21 and elevator control horn 40 of control surface 41. In particular, clevis 10 of this invention is preferably molded from nylon or some equivalent plastic whereby, among other things, aperture 20 and body 11 thereof will self-threadingly receive a threaded push rod 21 (FIGS. 5 and 6) whereby clevis 10 is longitudinally positionable and connectible to push rod 21 by rotatably receiving the threaded end of push rod 21 in aperture 20.

Clevis 10 of this invention is most appropriately installed by taking clevis 10, in its as-molded condition, (FIG. 2) and mounting same on push rod 21 as indicated above. After clevis 10 is appropriately secured to push rod 21 and adjusted thereon, control horn 40 is inserted between rounded pintle end 31 and aperture retaining arm 13, and an aperture 44 of horn 40 is positioned over pintle 14, and onto a bearing surface 45 of bearing portion 25.

Further installation of clevis 10 of this invention is accomplished by moving pintle support arms 12 and 13 toward each other whereby rounded pintle end 31 will enter aperture retaining means 27 of pintle support arm 13. Continued movement of pintle support arm 12 and 13 together, a predetermined distance, will deformably urge larger end portions 31 and 30 of pintle retaining means 26 through the restriction formed by the conically tapered surfaces 35 and 36 of the aperture retaining means 27 whereupon deformed pintle end portions 31 and 30, and crest 37 will, by returning to their as-formed configuration, cause the complementing conical surfaces 35 and 36 of aperture retaining means 27 and conical surfaces 28 and 29 of pintle retaining means 26 to lock into firm complemental interfitting engagement to releasably retain pintle 14 within pintle retaining arm 13.

Clevis 10 of this invention thereby provides a driving link interconnection between push rod 21 and control surface horn 40 which is readily and threadably adjustably attached to one drive link 21 while being adapted to receive another drive link 40 in snap or detenting relationship.

In addition to being readily insertable in positive locking relationship between drive links as indicated above, clevis 10 of this invention is readily selectively releasable for replacement of associated parts or adjustments. In particular, clevis 10 may be readily released for insertion in another aperture 46 (FIG. 6) of control horn 40 for a mechanical advantage adjustment or the like by simply inserting a screwdriver blade 50 between pintle support arms 12 and 13 (FIGS. 5 and 6) and twisting screwdriver 50 toward a position perpendicular to support arms 12 and 13 (FIG. 2), whereby pintle 14 will be detented out of locked insertion in retaining means 27. It should be noted that insertion of pintle retainer portion 26 is gradual and relatively easy in view of the gradually tapered conical surface 35. However, release of pintle retainer portion 26 requires a many times greater force, such as that which can be created by the twist of a screwdriver or a similar tool. Pintle 14 of clevis 10 is thereby easily connected to a drive link such as 40 but is not readily inadvertently disconnectible.

A second embodiment of the one-piece clevis of this invention is generally represented by the numeral 110 and is shown in FIGS. 1 and 8–15 for the purpose of illustrating and describing a second embodiment of this invention. The one-piece clevis 110 includes, among other things, a body 111, resilient bearing support arms 112 and 113 and a bearing pintle 114. The one-piece clevis structure 110 of the second embodiment of this invention is preferably formed from spring steel, although nylon or other plastics can be used, and is illustrated in a typical environment in use with an airplane 15.

Clevis body 111 (FIGS. 8-14) is provided with an aperture 120 extending axially therethrough which can be threaded to receive a threaded push rod 121 (FIGS. 10-14) as one drive link, or can self-threadingly receive the threaded push rod drive link 121, whereby the clevis is adjustably securable to the push rod 121. Push rod 121 is in turn secured to the reciprocating arm 22 of a servo 23 or the like which generates the motivating force to be transmitted by clevis 110.

Bearing support arms 112 and 113 are flat beam-like members extending generally from the exterior of body 111 in a spreading relationship from body 111, whereby arms 112 and 113 are resiliently flexible toward each other through the thinner lateral dimension thereof but are generally not flexible in a direction 90° thereto through the thicker dimension thereof.

Pintle 114 is formed as an integral or a secured part of bearing support arm 112 and comprises a bearing support portion 125 (FIGS. 8, 11 and 13-15) adjacent support arm 112, and a retaining end portion 126 extending to the end of pintle 114 and adjacent an aperture retaining means 127 (FIGS. 8, 11 and 13-15) in other support arm 113. Pintle retaining end portion 126 comprises generally, (FIGS. 13 and 14) a trough 137, a conical portion 129, a gradually tapered conical portion 128, and a rounded locating end surface 131.

Aperture retaining means 127 (FIGS. 8, 10 and 13-15) includes generally an aperture 135 slightly larger than a trough 137, slits 136 extending from aperture 135 to provide retaining spring fingers 138 therebetween (FIGS. 10, 13 and 14).

In operation, the clevis 110 of the second embodiment of this invention provides an adjustable and selectively releasable positive interconnecting link between reciprocating push rod 121 and elevator control horn 40 of control surface 41 and is installed in much the same manner as that described above for the first embodiment 10. The basic difference being the specifics of the reaction between pintle retaining portion 126 and aperture retaining portion 127. In particular, as the pintle support arms 112 and 113 are moved toward each other, rounded pintle end 131 will enter aperture 135 of aperture retaining means 127 of pintle support arm 113. Continued movement of pintle support arm 112 and 113 together, a predetermined distance, will urge larger end portion 131 and 130 of pintle retaining means 126 through the restriction formed by the aperture 135 of the aperture retaining means 127 by deflecting spring fingers 138 to allow pintle end portions 131 to pass through aperture 135. Fingers 138 will thereafter, by returning to their as-formed configuration, cause the aperture retaining means 127 to enter trough 127 against shoulder 129 to lock pintle 114 into firm complemental interfitting engagement with arm 113 and to releasably retain pintle 114 within pintle retaining arm 113.

Clevis 110 of the second embodiment of this invention thereby provides a driving link interconnection between push rod 121 and control surface horn 40 which is readily and threadably adjustably attached to one drive link 121 while being adapted to easily receive another drive link 40 in snap or detenting relationship to strongly resist release thereof.

In addition to being readily insertable in positive locking relationship between drive links as indicated above, clevis 110 of the second embodiment of this invention is readily selectively releasable for replacement of associated parts or adjustments. In particular, clevis 110 as well as clevis 10, may be readily released for insertion in the other aperture 46 of control horn 40 for a mechanical advantage adjustment or the like by simply inserting the screwdriver blade 50 between pintle support arms 112 and 113 (FIG. 11) and twisting the screwdriver toward a position perpendicular to support arms 112 and 113 (FIG. 8), whereby pintle 114 will be detented out of locked insertion in retaining means 127. It should be noted that insertion of pintle retainer portion 126 is gradual and relatively easy in view of the gradually tapered and rounded pintle surface 131. However, release of pintle retainer portion 126 requires a many times greater force, such as that which can be created by the twist of a screwdriver or a similar tool. Pintle 114 of clevis 110 is thereby easily connected to a drive link such as 40 but is not readily inadvertently disconnectible.

It is to be understood that the invention is not to be limited to the specific constructions and arrangements shown and described, as it will be understood to those skilled in the art that changes may be made without departing from the principles of the invention.

What is claimed is:

1. A one-piece clevis for interconnecting drive links comprising a body having a connector means for securing said clevis to one of the drive links, resilient bearing support arms generally flexible toward each other and extending from said body in spaced apart relation in the normal as-formed condition thereof, a bearing pintle on one of said arms extending axially inwardly from said one arm toward said other arm and terminating in a retaining means between said arms, said bearing pintle being adapted to receive the other drive link thereon in driving relation between said arms, and said other arm having an aperture means for receiving and releasably retaining said pintle by retaining said retaining means therein when said arms are moved together beyond a predetermined spacing distance therebetween, whereby the other drive link received on said pintle will be drivingly born by said pintle in a given space between said arms.

2. A one-piece clevis as defined in claim 1 wherein said arms are normally spaced apart the farthest at the end thereof which is the farthest away from said body in the normal as-formed condition thereof.

3. A one-piece clevis as defined in claim 1 wherein said support arms extend at acute angles with respect to the axis of said body in the normal as-formed condition thereof.

4. A one-piece clevis as defined in claim 1 wherein said support arms extend divergently from the outer edges of said body to provide a predetermined space therebetween at said body.

5. A one-piece clevis as defined in claim 1 wherein said bearing pintle has a connecting drive link bearing portion supported between said pintle retaining means and the arm from which said pintle extends for receiving and positively bearing the other drive link in the driving relation between said arms.

6. A one-piece clevis as defined in claim 1 wherein said bearing pintle retaining means has a resiliently deformable rounded end portion having a lateral dimension greater than the smallest diameter of said arm aperture for respectively deformably guiding said pintle retaining means into said arm aperture and expandably releasably retaining said pintle retaining means in said arm aperture means when said arms are moved together beyond the predetermined distance.

7. A one-piece clevis as defined in claim 1 wherein said bearing pintle retaining means and said aperture retaining means have resiliently deformable and interlocking complementing surfaces for releasably retaining said pintle in said aperture by complementally retaining said pintle retaining means therein.

8. A one-piece clevis as defined in claim 7 wherein said interlocking complementary surfaces respectively comprise axially complemental surfaces having a diminishing taper in a direction away from said pintle arm and axially shorter respectively complemental and resiliently deformable surfaces having a diminishing taper in a direction toward said pintle arm.

9. A one-piece clevis as defined in claim 6 wherein said bearing pintle retaining means and said aperture retaining means have resiliently interlocking complementing surfaces for releasably retaining said pintle in said aperture, and said interlocking surfaces comprise axially complemental surfaces having a diminishing taper away from said pintle arm and axially shorter respectively complemental and resiliently deformable surfaces having a diminishing taper toward said pintle arm.

10. A one-piece clevis as defined in claim 1 wherein said bearing pintle retaining means has a rounded end portion having a lateral dimension greater than the smallest diameter of said arm aperture for respectively deformably guiding said pintle retaining means into said arm aperture and expandably releasably retaining said pintle in said arm aperture means with said pintle retaining means in engagement with said aperture arm and positioned within said aperture means with said arms are moved together beyond the predetermined distance.

11. A one-piece clevis as defined in claim 10 wherein said aperture retaining means aperture is provided with circumferentially spaced radially extending cuts therethrough to provide resilient radially extending fingers whereby said fingers will be resiliently axially deflected to allow passage of said pintle through said aperture and to return upon passage of said pintle end portion to retain said pintle.

12. A one-piece clevis as defined in claim 11 wherein said pintle has an annular retaining trough adjacent said end portion thereof for axially receiving and retaining said fingers on said pintle.

13. A one-piece clevis as defined in claim 12 wherein said trough comprises an abruptly tapered inwardly extending shoulder adjacent said pintle end portion and a radially extending shoulder axially spaced therefrom whereby said gradually tapered pintle end will provide entry of said pintle into said retaining aperture as a result of a minimum given force and said abrupt annular trough shoulder will provide withdrawal of said pintle only upon exertion of a much greater force to provide a ready connection and a resistive disconnection between said pintle and said retaining arm.

* * * * *